United States Patent Office.

OBADIAH V. GARNETT, OF VERSAILLES, KENTUCKY.

Letters Patent No. 63,627, dated April 9, 1867.

IMPROVED MEDICAL COMPOUND.

*The Schedule referred to in these Letters Patent and making part of the same.*

TO ALL WHOM IT MAY CONCERN:

Be it known that I, OBADIAH V. GARNETT, of Versailles, in the county of Woodford, and State of Kentucky, have originated a new Compound of several Drugs, which, by their combination, have the power to effectually remove and eradicate from the human system the malaria which produces fever and ague, of which the following is the formulary:

R. Sulphate of alumina and the sulphate of ferrum, and by a very severe heat remove the water of crystallization, forming by this process the non-oxidized alumen and iron. Take four grains of each of the above ingredients, with one grain of Af. cayenne pepper, thoroughly mixing, and by using one of the above powders three times a day for twelve (12) days the disease will be thoroughly removed from the system, as well as the cause producing it.

The name given the powder is derived from the plant *Jussiena grandifolia*, growing in the swamps of Louisiana, which is claimed to have the same properties as the medicine above described, and having the same virtues, will be called the Jussiena Powders.

What I claim as my invention, and desire to secure by Letters Patent, is—

The combination of the medicines into the compound herein set forth.

O. V. GARNETT.

Witnesses:
C. O. SMITHERS,
W. M. DICKEY.